United States Patent [19]
Ishikawa et al.

[11] Patent Number: 6,116,055
[45] Date of Patent: Sep. 12, 2000

[54] METHOD OF MAKING SYNTHETIC SILICA GLASS

[75] Inventors: Shinji Ishikawa; Masashi Onishi, both of Yokohama, Japan

[73] Assignee: Sumitomo Electric Industries, Ltd., Osaka, Japan

[21] Appl. No.: 09/191,123

[22] Filed: Nov. 13, 1998

[51] Int. Cl.$^7$ .................................................. C03C 13/04
[52] U.S. Cl. ................ 65/399; 65/413; 65/416; 65/422; 65/424; 65/427
[58] Field of Search .............................. 65/399, 413, 414, 65/415, 416, 421, 422, 424, 427

[56] References Cited

U.S. PATENT DOCUMENTS

| | | |
|---|---|---|
| 3,933,454 | 1/1976 | DeLuca . |
| 5,106,401 | 4/1992 | Ishikawa et al. . |
| 5,259,856 | 11/1993 | Ohga et al. . |
| 5,306,322 | 4/1994 | Ishikawa et al. . |
| 5,470,369 | 11/1995 | Tsuchiya et al. . |

FOREIGN PATENT DOCUMENTS

| | | |
|---|---|---|
| 63-315531 | 12/1988 | Japan . |
| 3-115136 | 5/1991 | Japan . |
| 10-53423 | 2/1998 | Japan . |

OTHER PUBLICATIONS

Optical Fiber Communication Conference and Exhibit, Technical Digest, Conference Edition, Feb. 22–27 1998, vol. 2.

Kenzo Susa et al., "Reduction of Chlorine Content in Sol–Gel Derived Silica Glass", Journal of Non–Crystalline Solids, vol. 79, 1986, pp. 165–176.

*Primary Examiner*—Stanley S. Silverman
*Assistant Examiner*—Michael P. Colaianni
*Attorney, Agent, or Firm*—McDermott, Will & Emery

[57] ABSTRACT

Disclosed is a synthetic silica-glass fabricating method in which the doping of chlorine into silica glass made by using a flame hydrolysis or thermal oxidation is increased. The process comprises the steps of producing a porous deposit of silica-glass particles through treatment of gaseous silicon compounds by the flame hydrolysis or the thermal oxidation process; and consolidating the porous deposit by a heat treatment in an atmosphere including an inert gas and silicon tetrachloride ($SiCl_4$) gas.

6 Claims, 6 Drawing Sheets

METHOD OF MAKING SYNTHETIC SILICA GLASS

BACKGROUND OF THE INVENTION

1. Field of the Invention

The present invention relates to a method of making synthetic silica glass, more specifically to a method for doping chlorine into silica glass.

2. Description of the Background Art

It is known that the refractive index of silica glass may be increased by doping oxides such as $GeO_2$ or $TiO_2$. Chlorine is another dopant that increases the refractive index. As shown in the literature "Reduction of Chlorine Content in Sol-Gel Derived Silica Glass" by K. Susa et al. in *J. Non-Crystalline Solid*, Vol. 79, 1986, pp. 165–176, chlorine can increase the relative refractive index difference by 0.11% per 1 weight % of chlorine. However, the sol-gel method used in this literature has difficulty in producing a large preform. And unexamined published Japanese patent application Tokukaihei 3-115136 discloses that the refractive index may be controlled by changing the chlorine partial pressure during the treatment of a deposit of glass particles called "soot," which is formed by flame hydrolysis, in a mixed atmosphere including chlorine gas. However, this method controls the relative refractive index difference only by about 0.04%. Unexamined published Japanese patent application Tokukaishou 63-315531 discloses a heat treatment in an atmosphere including $SiCl_4$. However, $SiCl_4$ is used for a different purpose and it is not disclosed to add chlorine into silica glass.

SUMMARY OF THE INVENTION

In view of the above problems, it is an object of the present invention to provide a novel method in which the doping of chlorine into silica glass made by using a flame hydrolysis or thermal oxidation process is increased, and which is superior as a mass production process.

In a first embodiment of the present invention the method comprises the steps of:

producing a porous deposit of silica-glass particles through treatment of gaseous silicon compounds by the flame hydrolysis or the thermal oxidation process; and consolidating the porous deposit of silica-glass particles by a heat treatment in an atmosphere including an inert gas and silicon tetrachloride ($SiCl_4$) gas.

According to this embodiment the refractive index of the synthetic silica glass increases and a uniform refractive index profile can be obtained. The presence of an inert gas enables the control of $SiCl_4$ concentration so that a desired increase of the index may be fulfilled. Such an inert gas as He, Ar, Ne, or $N_2$ may be used. Of all the inert gases cited above, helium is most preferable because it leaves few bubbles behind.

In a second embodiment of the invention the method of the first embodiment is such that the partial pressure of the $SiCl_4$ gas is preferably maintained within the range of 0.03 to 1 atm, which corresponds to 3 vol. % to 100 vol. % so that a greater increase in the refractive index can be realized by $SiCl_4$ than by chlorine. If the partial pressure of $SiCl_4$ is less than 0.03 atm, the increase of the refractive index is not sufficient, and if it is more than 1 atm, a pressurized furnace must be used, entailing a problem of complex furnace structure.

In a third embodiment of the invention the method of the first embodiment is such that the concentration of the $SiCl_4$ gas is preferably maintained within the range of 3 vol. % to 60%. According to this embodiment the consumption of $SiCl_4$ by the moisture in the deposit of the silica-glass particles can be ignored and the reaction time to reach an equilibrium can be reduced. These advantages are particularly applicable to the concentration of the $SiCl_4$ gas in the range of 20 vol. % to 60%.

In a fourth embodiment of the invention the method of the third embodiment is such that the concentration of the $SiCl_4$ gas is maintained within the range of 3 vol. % and 20%. According to this embodiment the required amount of $SiCl_4$ for the corresponding doping amount of chlorine can be decreased, eliminating special consideration for the gas treatment.

In a fifth embodiment of the invention the method of the first embodiment is such that, prior to the consolidation process, the porous deposit of the silica-glass particles is dehydrated at a temperature in the range of 800° C. to 1300° C. in an inert gas atmosphere including at least one gas selected from the group consisting of chlorine and chlorides. According to this embodiment the generation of problematic dust due to $SiO_2$ produced by the reaction between $SiCl_4$ and the moisture in the porous deposit of silica-glass particles can be inhibited during the consolidation process. If a dehydration temperature is higher than 1300° C., the porous deposit of silica-glass particles will shrink, decreasing the efficiency of chlorine doping by $SiCl_4$. If it is lower than 800° C., the dehydration will be insufficient. As a chloride for the dehydration process, $SiCl_4$, $CCl_4$, or $SOCl_2$ may be used.

In a sixth embodiment of the invention the method of the first embodiment is such that the consolidation is carried out with oxygen concentration of less than 100 ppm in the atmospheric gas. According to this embodiment the $SiCl_4$ gas does not suffer oxidative degradation that causes the partial pressure of $SiCl_4$ to lower. Thus, the amount of chlorine doping does not decrease. (See reaction formula (3) below.)

DETAILED DESCRIPTION OF THE INVENTION

In the following the basis of the constitution of the invention is clarified by the effectiveness proved by the experimental data including some referential data for comparison.

EXPERIMENTAL EXAMPLES

Experiments Were Conducted in the Following Manner

Porous deposits of silica-glass particles having dimensions of 120 mm in diameter and 300 mm in length were prepared by the vapor-phase axial deposition method (VAD) using $SiCl_4$ as a source material. Dehydration and consolidation treatments were performed in the gas atmosphere shown in Table 1 below with the equipment shown in FIG. 1.

TABLE 1

| | Atmospheric gas | | Results | |
|---|---|---|---|---|
| Experiment No. | At dehydration process (1100° C.) (lit./min.) | At consolidation process (1600° C.) (lit./min.) | Relative refractive index difference (%) | Profile of Refractive index |
| 1 | $Cl_2$/He = 0.2/15 | $Cl_2$/He = 0.2/15 | 0.025 | A |
| 2 | $Cl_2$/He = 1/15 | $Cl_2$/He = 1/15 | 0.030 | A |
| 3 | $SiCl_4$/He = 0.2/15 | $SiCl_4$/He = 0/15 | 0.041 | B |
| 4 | $SiCl_4$/He = 1.0/15 | $SiCl_4$/He = 0/15 | 0.055 | B |
| 5 | $SiCl_4$/He = 0.2/15 | $SiCl_4$/He = 0.2/15 | 0.051 | C |
| 6 | $SiCl_4$/He = 1.0/15 | $SiCl_4$/He = 1.0/15 | 0.078 | C |
| 7 | $SiCl_4$/He = 1.0/3 | $SiCl_4$/He = 1.0/3 | 0.108 | C |

Figure 2:
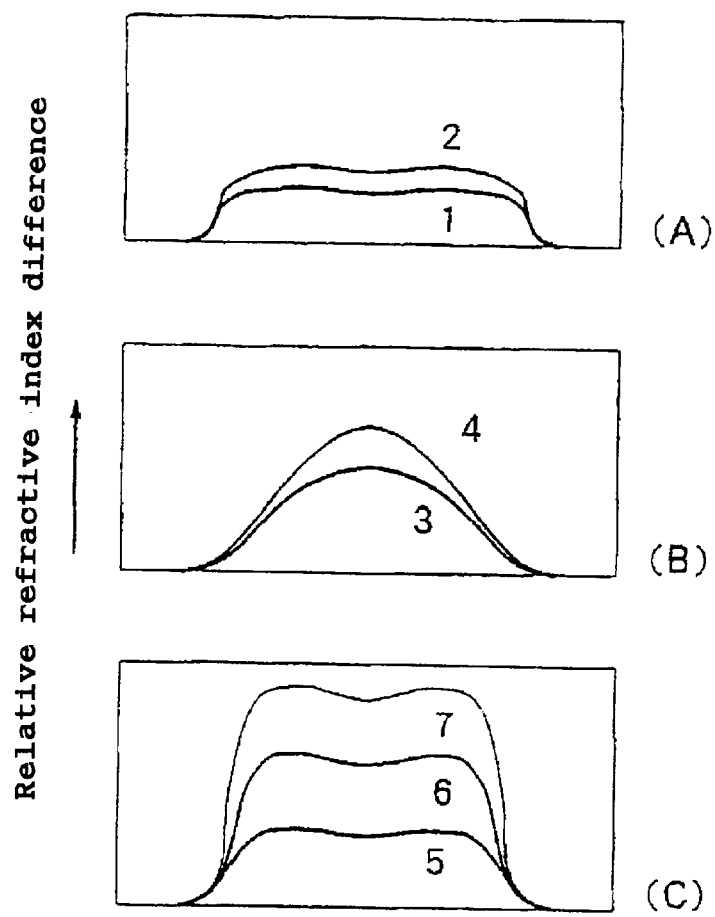
FIGS. 2 (A), (B), and (C) are graphs showing the profiles of the relative refractive index difference of the silica glass bodies fabricated in the experimental examples.

In the Table 1 above, the term "relative refractive index difference" represents the relative difference of the refractive index of the center portion of the silica glass bodies in respect to the refractive index of synthetic silica glass (150 ppm in OH concentration) not subjected to dehydration but consolidation in a helium atmosphere, as a reference. The sectional profiles of the relative refractive index difference for the individual experiments are shown in FIG. 2.

Experiments 1 and 2, where a chlorine gas and helium were used for both the dehydration and the consolidation, resulted in the smallest relative refractive index difference, namely, the relative refractive index difference of 0.03% at most. Experiments 3 and 4, where $SiCl_4$ displaced a chlorine gas for dehydration and only helium was used for consolidation, showed convex profiles of the refractive index in the diametrical direction. Experiments 5, 6, and 7, where $SiCl_4$ was used in place of a chlorine gas for both the dehydration and the consolidation, exhibited substantially uniform profiles and high values of the relative refractive index difference, as high as 0.108% as contrasted with the low values obtained when a chlorine gas was used.

Figure 3:
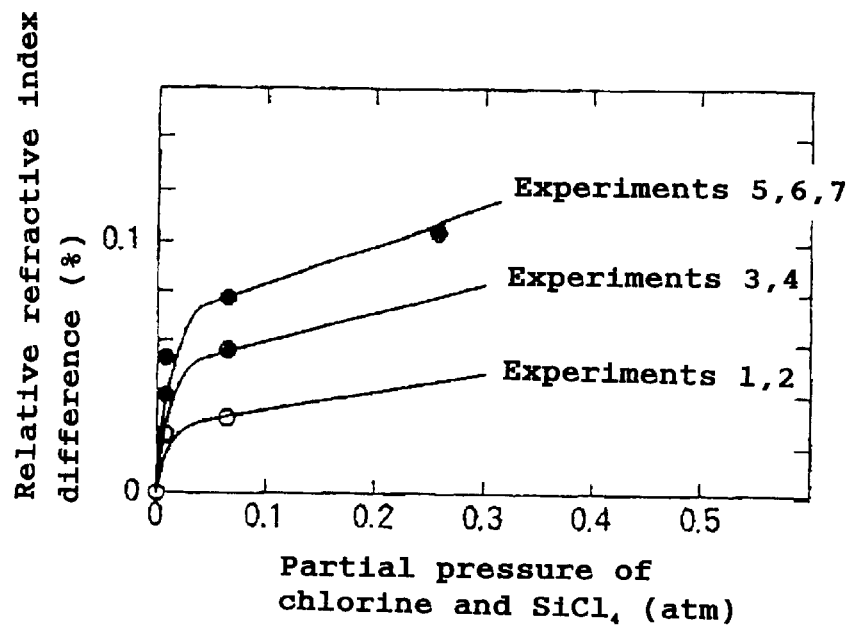
FIG. 3 is a graph showing the relation between the relative refractive index difference and the partial pressure of chlorine and $SiCl_4$.

The following is a summation of the facts confirmed by the above experiments and prior art:

(1) When a chlorine gas is used in the dehydration process and the consolidation process for the deposits of silica-glass particles, a doped amount of chlorine has a rather low limitation of about 0.04% at most in terms of the relative refractive index difference. (See FIG. 3.)

The above experiments lead to the following consideration on the chemical reaction of chlorine doping into silica glass:

(a) An $SiCl_4$ gas can introduce much more chlorine to silica glass than a chlorine gas can. (See FIG. 3.)

Figure 4:
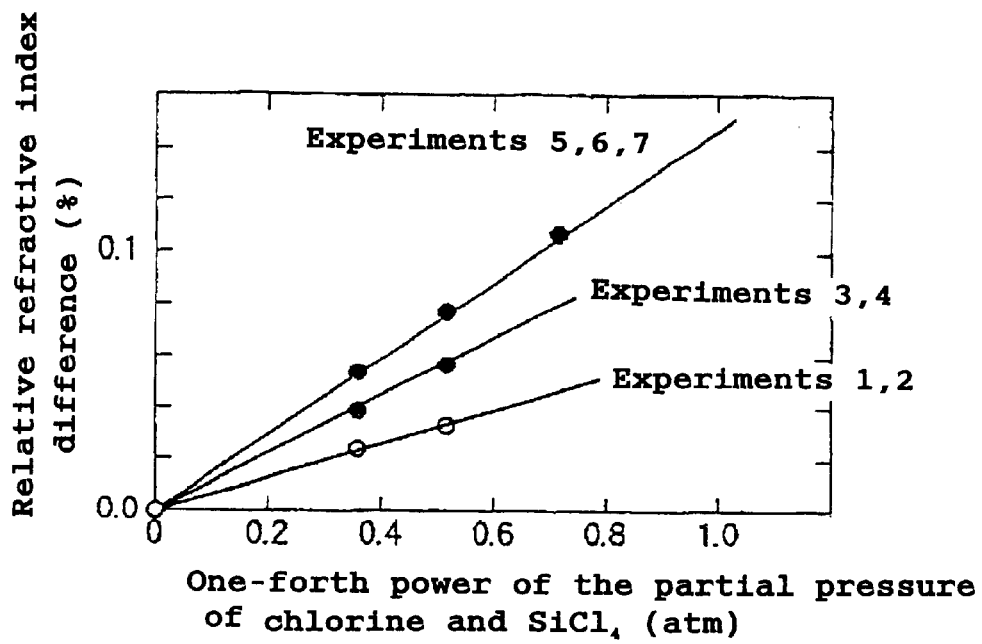
FIG. 4 is a graph showing the relation between the relative refractive index difference and the one-fourth power of the partial pressure of chlorine and $SiCl_4$.

(b) When an $SiCl_4$ gas is used, the amount of chlorine doped into silica glass is proportional to the one-fourth power of $SiCl_4$ concentration. (See FIG. 4.)

(c) Apart from the process relating to the present invention, it is known that the amount of fluorine doped into silica glass is proportional to the one-fourth power of the concentration of fluorine in the atmospheric gas during the consolidation process. It is understood that this reaction is based upon the establishment of the reaction equilibrium shown in chemical formula (1) below. (*See the Journal "C" of the Institute of Electronics, Information and Communication Engineers of Japan*, Vol. J71-C, No. 2, 1988, pp. 212–220.)

$$SiF_4 + 3SiO_2 = 4SiO_{1.5}F \quad (1)$$

The facts shown in (b) and (c) above enable the theorizing that the doping of chlorine into silica glass is conducted under reaction equilibrium similar to that for the doping of fluorine. Thus, the reaction equilibrium is expressed in the following chemical formula:

$$SiCl_4 + 3SiO_2 = 4SiO_{1.5}Cl \quad (2)$$

The reason why a chlorine gas introduces less chlorine than $SiCl_4$ does is discussed below:

As can be seen in formula (2), the doping of chlorine is conducted in the form of $SiCl_4$. In the case of a chlorine gas, therefore, $SiCl_4$ must be formed, as shown in formula (3) below, by the reaction between the deposit of silica-glass particles and chlorine before the reaction expressed in formula (2) takes place.

$$SiO_2 + 2Cl_2 = SiCl_4 + O_2 \quad (3)$$

Figure 5:
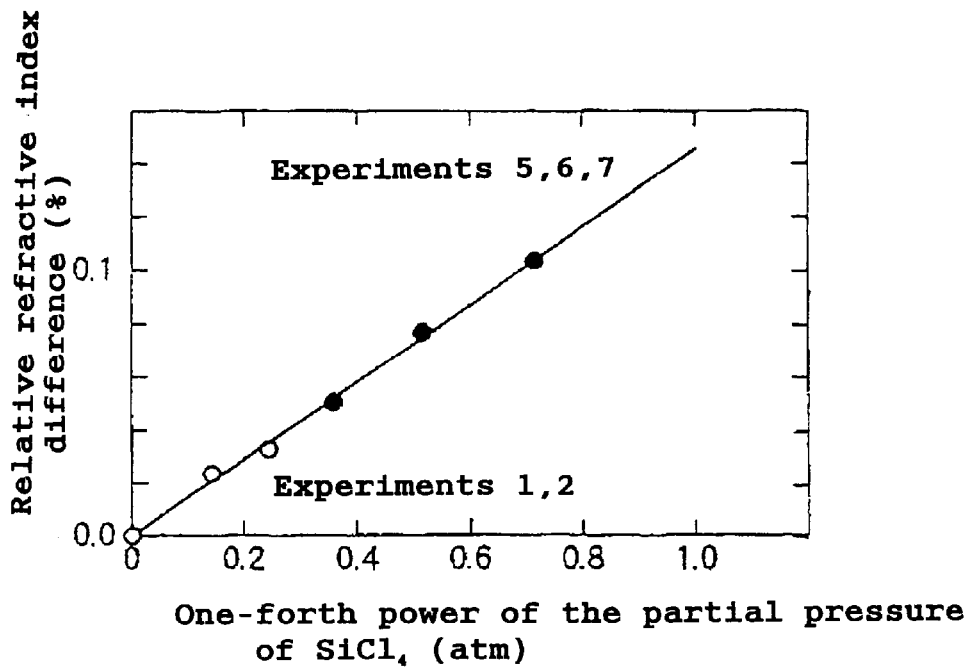
FIG. 5 is a graph showing the relation between the relative refractive index difference and the one-fourth power of the partial pressure of $SiCl_4$, where the amount of chlorine is converted into the partial pressure of $SiCl_4$ using the equilibrium in reaction formula (3).

When a chlorine gas is used, effective $SiCl_4$ concentration is calculated using formula (3). The calculation results are plotted in FIG. 5 along with the results of the experiments where $SiCl_4$ was used. As is seen in FIG. 5, the results are expressed in a common line which goes through the origin. This means that chlorine is doped through the equilibrium of reaction formula (2) without depending on the source of chlorine gas.

When the concentration of $SiCl_4$ is 3 vol. % or more in the consolidation process, much greater increase in the refractive index is attainable than when a chlorine gas is used. When a chlorine gas is used, if its partial pressure is 0.2 atm or more, bubbles of chlorine gas begin to form in the glass. On the other hand, when $SiCl_4$ is used, even if its partial pressure exceeds 0.5 atm, no bubbles form.

Low concentration of $SiCl_4$ is undesirable for the production because it results in the following problem:

First, because of the low flow rate of $SiCl_4$, considerable time is required to reach the equilibrium for the doping of chlorine. The consumption of $SiCl_4$ by the moisture in the porous deposit of silica-glass particles also prolongs the reaction time, though this may be suppressed by subjecting it to the dehydration treatment before its consolidation. A chlorine gas or a chloride gas such as $SiCl_4$ or $CCl_4$ may be used for the dehydration. If the porous deposit shrinks with this treatment, the efficiency of the chlorine doping by $SiCl_4$ decreases. To avoid this shrinkage, it is desirable that the dehydration temperature be set below 1300° C.

Second, as can be seen in reaction formula (3), when oxygen is present in the atmospheric gas, the reaction between $SiCl_4$ and the oxygen produces a chlorine gas and $SiO_2$. This decreases the doped amount of chlorine due to the reduction of the effective $SiCl_4$ concentration and deteriorates the quality of the consolidated silica glass body due to the deposition thereto of the $SiO_2$ thus produced. The $SiO_2$ also deteriorates the furnace by depositing on the wall of the furnace. To prevent this, it is necessary to reduce the oxygen concentration in the furnace to as low as possible, preferably less than 100 ppm.

(2) When $SiCl_4$ is not fed during the consolidation process, the profile of the refractive index becomes convex as is seen in FIG. 2 (B) obtained in experiments 3 and 4. This is because the chlorine used in the dehydration process escapes out of the periphery of the deposit of silica glass particles during the consolidation process. To prevent this, it is effective to feed $SiCl_4$ during the consolidation process as was proved by the experiment above.

DESCRIPTION OF THE PREFERRED EMBODIMENT

The invention will be further described in detail by the examples below.

However, these examples do not impose limitations on the scope of application of the invention.

EXAMPLE 1

Figure 6:
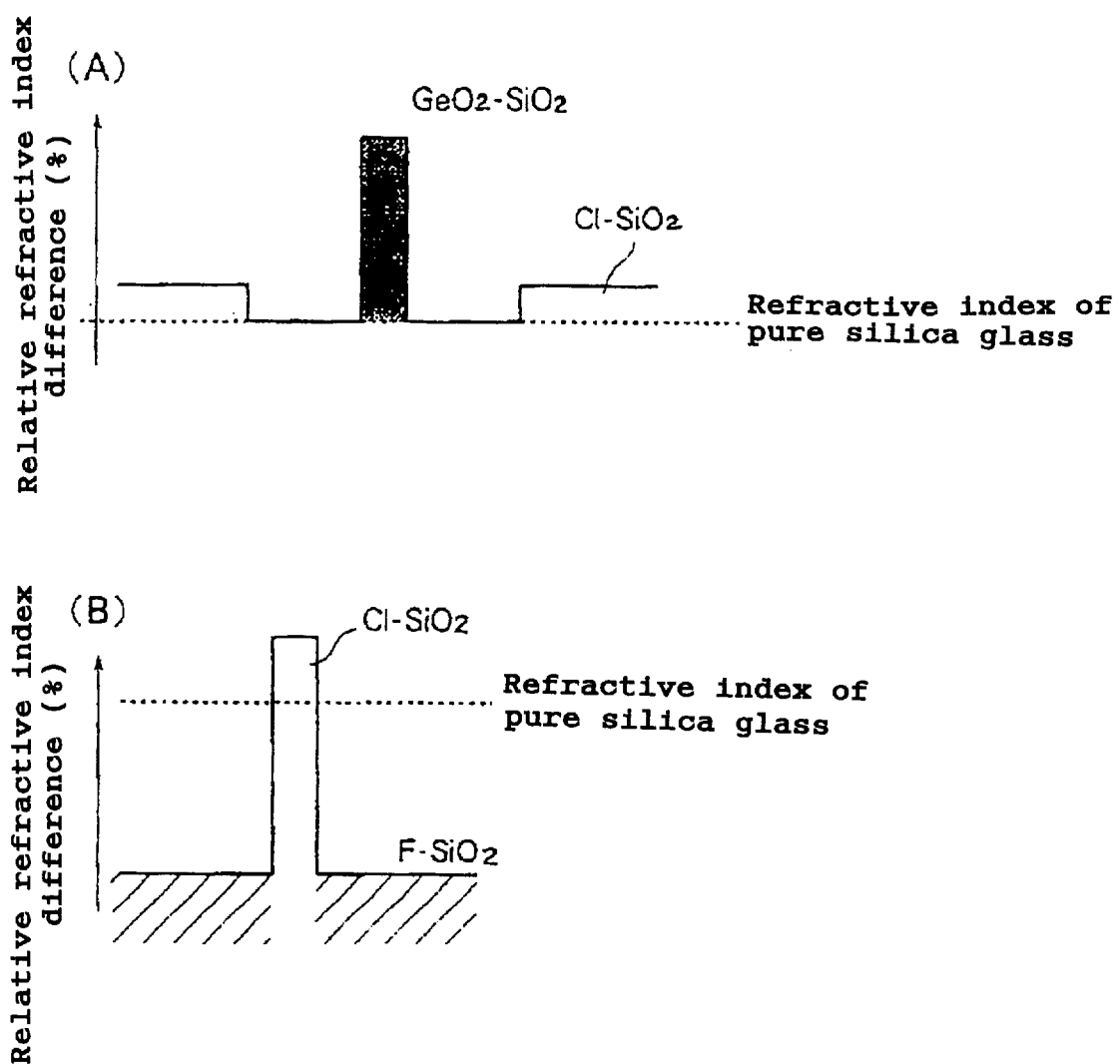
FIGS. 6 (A) and (B) are graphs showing the profiles of relative refractive index difference of the silica glass bodies fabricated in Examples 1 and 2.

This is an example in which the invention is applied to a method of making a preform for a single-mode optical fiber that has two layers of claddings where the outer cladding has a higher refractive index than the inner cladding in order to improve the chromatic dispersion characteristics. As a starting member, the core and inner cladding of the preform were prepared by the VAD method, with an inner-cladding-diameter/core-diameter ratio being 4.2/1 and $GeO_2$ being doped to the core to obtain a core-cladding relative refractive index difference of 0.37%. Silica-glass particles were deposited around the transparent starting member, and then consolidated by passing through the ring heater of 1600° C. in the furnace shown in FIG. 1 in an atmospheric gas consisting of $SiCl_4$ (5 vol %) and He (95 vol %). The preform thus fabricated has an outer-cladding/inner-cladding relative refractive index difference of 0.05%. FIG. 6 (A) shows the total profile of refractive index for the obtained optical fiber preform with a depressed-cladding structure. It was also possible to produce a depressed-cladding structure with an outer-cladding/inner-cladding relative refractive index difference of 0.04 to 0.11% by controlling the $SiCl_4$ concentration in the range of 3 to 20 vol. % during the consolidation process using the same starting member.

EXAMPLE 2

This is an example in which the synthetic silica glass of the present invention is used as the core of a preform having a fluorine-doped cladding. The core was prepared by consolidating a deposit of silica glass particles formed in the same manner as described in the experimental examples in an atmospheric gas having $SiCl_4$ concentration of 50 vol %. The core had a relative refractive index difference of +0.13% in respect to the pure silica glass reference. Applied over the core was a cladding of fluorine-doped silica glass having a relative refractive index difference of −0.55% in respect to the pure silica glass reference. Thus fabricated was a dispersion-shifted optical fiber preform whose cladding-diameter/core-diameter ratio was 23/1, and core-cladding relative refractive index difference was 0.68%. The refractive index profile is shown in FIG. 6 (B). The drawing of this preform yielded a low-loss, dispersion-shifted fiber having a loss of 0.197 dB/km and a zero-dispersion wavelength of 1553 nm.

EXAMPLE 3

This is an example in that the synthetic silica glass of the present invention is applied to increase the numerical aperture (NA) of an ultraviolet-ray-transmitting fiber. The core was synthetic silica glass prepared by the same method and conditions as in example 2. The cladding was fluorine-doped silica glass having a relative refractive index difference of −0.65% in respect to the pure silica glass reference. Thus fabricated was a preform whose cladding-diameter/core-diameter ratio was 1.1/1 and its core-cladding relative refractive index difference was 0.78%. (Incidentally, when silica glass having OH concentration of 700 ppm was used as a core, with the same cladding as above, the resultant core-cladding relative refractive index difference was 0.64%.) The preform of 0.78% relative refractive index difference was drawn to make an ultraviolet-ray-transmitting fiber of 180 μm in diameter. The fiber had a low-loss characteristic of 75 dB/km at a wavelength of 330 nm and showed no loss except the loss due to Rayleigh-type scattering at wavelengths from 280 to 800 nm. The NA of the fiber was 0.195, larger than the 0.172 obtained by a fiber with pure silica glass as the core. The large core-cladding relative refractive index difference made it possible to increase the NA.

EXAMPLE 4

This example shows a doping effect of chlorine upon a refractive index when multi-stage heating treatment is carried out in an $SiCl_4$ atmosphere.

Figure 1:
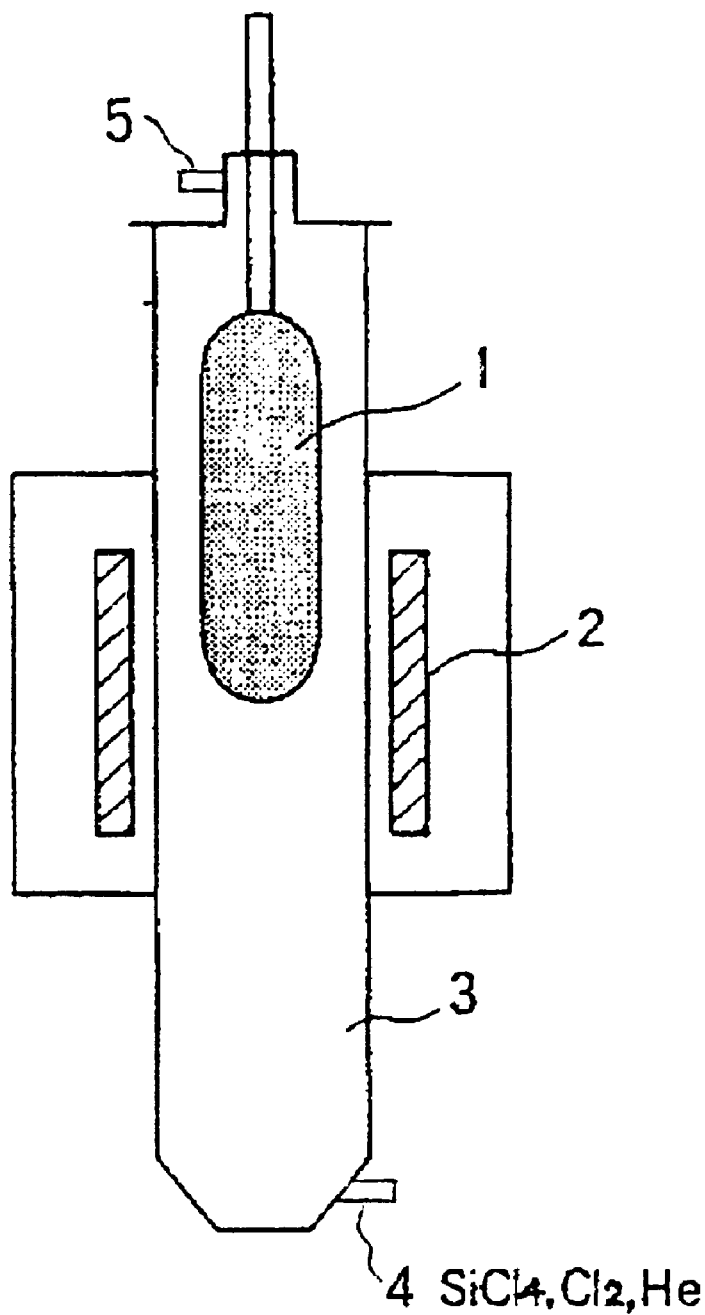
FIG. 1 is an outline of a furnace used for the dehydration and consolidation processes according to the present invention. The porous deposit of silica-glass particles 1 is suspended at the inside of the furnace core tube 3, which, surrounded by a ring heater 2, has a feeding pipe 4 for an atmospheric gas including $SiCl_4$, $Cl_2$, and/or He, and a gas exhausting pipe 5.

A deposit of silica-glass particles formed by the same manner as described in the experimental examples was dehydrated by passing the zone heating furnace shown in FIG. 1 at 1100° C. in a mixed atmosphere of $SiCl_4$ (5 vol %) and helium (95 vol %). The deposit was then consolidated at an increased furnace temperature of 1600° C. in the same atmosphere. The consolidated glass had a relative refractive index difference of +0.08% in respect to the pure silica glass reference. This glass, being used as a core, was then clad with fluorine-doped silica glass having a relative refractive index difference of −0.65% in respect to the pure silica glass reference. Thus fabricated was a dispersion-shifted optical fiber preform whose cladding-diameter/core-diameter ratio was 24/1 and core-cladding relative refractive index difference was 0.73%. Drawing of this preform yielded a dispersion-shifted fiber having a loss of 0.207 dB/km and a zero-dispersion wavelength of 1550 nm. In comparison with example 2, the large relative refractive index difference confirmed the reduction of a bending loss down to 1/10.

As shown in the experimental examples, adjustments of $SiCl_4$ concentration during the dehydration and the consolidation process made it possible to increase a relative refractive index difference by a range of 0.04 to 0.13% as compared with pure silica glass.

EXAMPLE 5

Figure 7:
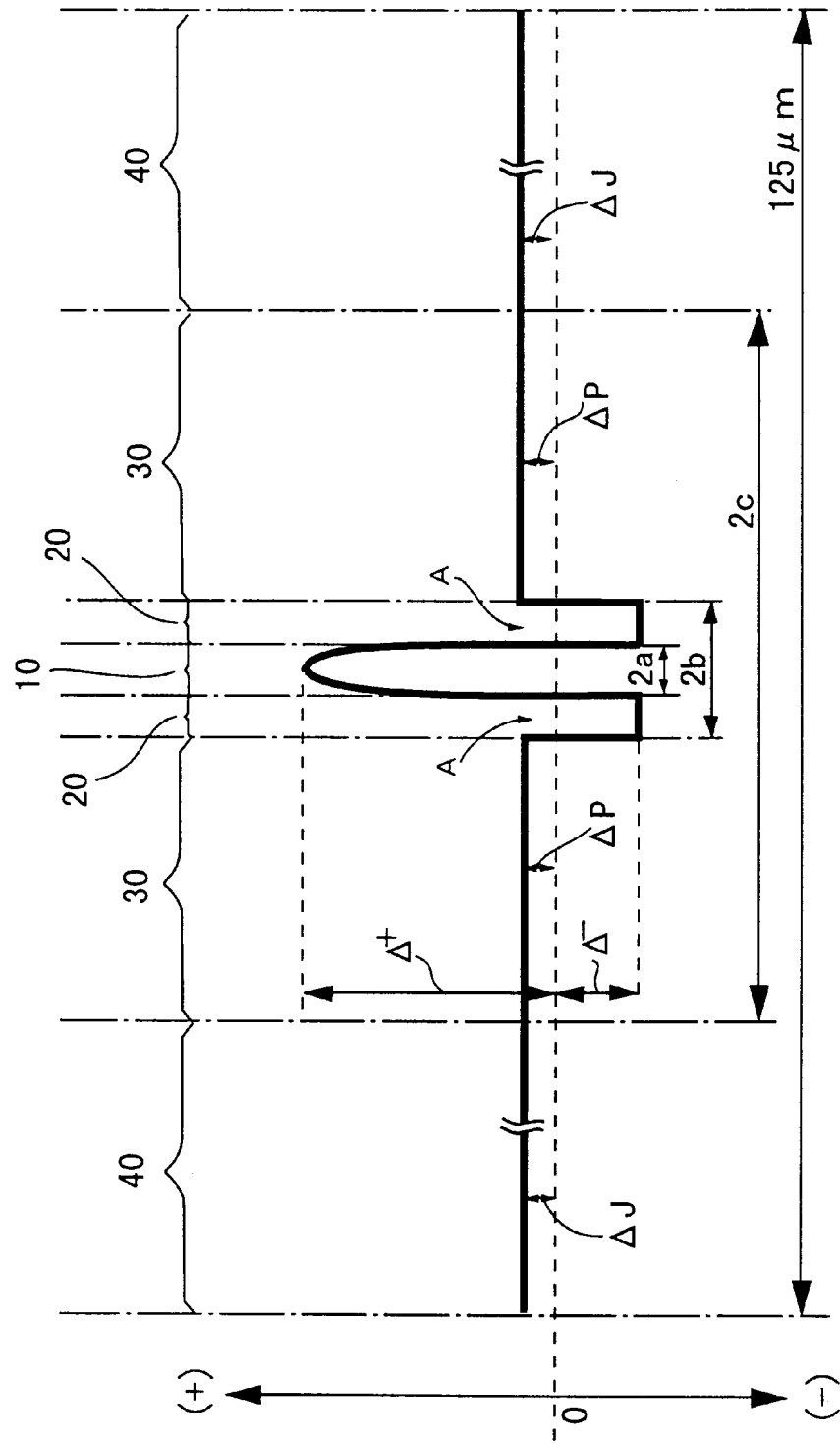
FIG. 7 is a graph showing the refractive index profile of the optical fiber preform in Example 5.

This is an example in which the present invention is applied to a dispersion-compensating fiber. FIG. 7 illustrates the refractive index profile of this example. The sample of the example comprises the following constituents:

The core 10: $SiO_2$ glass in which a proper amount of $GeO_2$ is doped, increasing the refractive index;

The first cladding 20: $SiO_2$ glass in which a proper amount of fluorine is doped, decreasing the refractive index;

The second cladding 30: $SiO_2$ glass in which a proper amount of chlorine is doped, increasing the refractive index, so that the glass viscosity at the time of drawing becomes lower than that of pure silica glass;

The third cladding 40: $SiO_2$ glass in which a proper amount of chlorine is doped, increasing the refractive index, so that the glass viscosity at the time of drawing becomes lower than that of pure silica glass.

The dispersion-compensating fiber in this example, having the structure shown in FIG. 7, was fabricated under the following conditions:

Specifically, a plurality of fiber preforms having $\Delta^+$ of 2.1%, $\Delta^-$ of −0.35%, $\Delta P$ of 0.08%, and $\Delta J$ of 0%, 0.03%, 0.08%, or 0.12% were fabricated.

The doping of chlorine into the second and the third cladding was conducted with the following process:

Over a intermediate preform fabricated up to the second cladding, a porous soot deposit of $SiO_2$ was formed by the VAD method using $SiCl_4$ as a raw material. The sample was heated at 1100° C. in a furnace in an atmosphere having a predetermined partial pressure of $SiCl_4$ to dope chlorine into the porous soot deposit around the intermediate preform, and then the furnace temperature was raised to 1550° C. to consolidate the soot deposit.

The relation between $\Delta J$ and the partial pressure of $SiCl_4$ during the consolidation treatment is shown in Table 2 below:

TABLE 2

| $\Delta J$ (%) | Partial pressure of $SiCl_4$ (atms) |
|---|---|
| 0.0 | 0 |
| 0.03 | 0.002 |
| 0.08 | 0.20 |
| 0.12 | 0.54 |

Each preform was drawn at a tension of 9.8 kg/mm² with a constant speed to produce a dispersion-compensating fiber having dimensions of 2a=2.7 μm, 2b=7.7 μm, and 2c=46 μm. The fibers thus obtained have a chromatic dispersion of −101 ps/km/nm and a dispersion slope of −0.3 ps/km/nm² as dispersion characteristics at the light having a wavelength of 1.55 μm.

Figure 8:
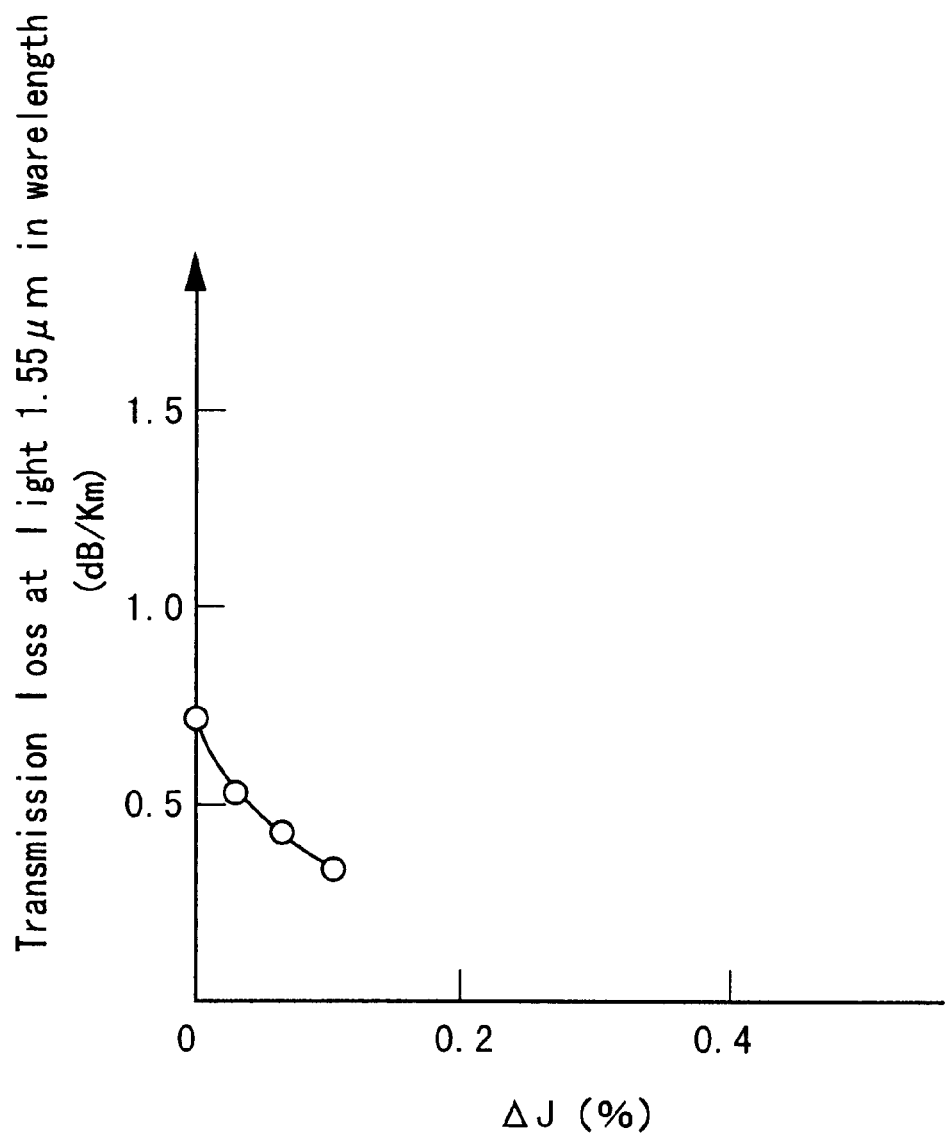
FIG. 8 is a graph showing the optical transmission loss of the dispersion-compensating fiber in Example 5.

The measured results of light transmission losses of individual fibers each having a different value of $\Delta J$ are plotted in FIG. 8. As the graph in FIG. 8 shows, the increase in doping ratio of chlorine into the third cladding 4, that is, the increase in relative refractive index difference $\Delta J$, causes the light transmission loss to decrease.

What is claimed is:

1. A method of making synthetic silica-glass containing chlorine which comprises the steps of:

producing a porous deposit of silica-glass particles by treating gaseous silicon compounds by flame hydrolysis or the thermal oxidation process; and consolidating said porous deposit by heat treatment in an atmosphere comprising an inert gas and silicon tetrachloride ($SiCl_4$) gas, wherein the concentration of the $SiCl_4$ gas is maintained within the range of 3 vol. % to 100 vol. % such that chlorine is introduced to the silica glass from the $SiCl_4$, wherein the amount of chlorine doped into the silica glass is substantially proportional to the one-fourth power of the $SiCl_4$ concentration.

2. A method of making synthetic silica-glass containing chlorine according to claim 1, wherein the concentration of $SiCl_4$ gas is maintained at more than 3 vol. % up to 60 vol. %.

3. A method of making synthetic silica-glass containing chlorine according to claim 1, wherein the concentration of $SiCl_4$ gas is maintained at more than 3 vol. % up to 20 vol. %.

4. The method of making synthetic silica-glass according to claim 1, wherein said porous deposit is, prior to the consolidation process, dehydrated at a temperature in the range of 800° C. to 1300° C. in an inert gas atmosphere including at least one gas selected from the group consisting of chlorine and chlorides.

5. The method of making synthetic silica-glass as defined in claim 1, wherein the consolidation process is carried out with oxygen concentration of less than 100 ppm in the atmospheric gas.

6. A method of making synthetic silica-glass containing chlorine according to claim 1, wherein the concentration of $SiCl_4$ gas is maintained at more than 5 vol. % up to 50 vol. %.

* * * * *